United States Patent [19]
Schefe

[11] 3,868,697
[45] Feb. 25, 1975

[54] TEMPERATURE RECORDER

[75] Inventor: Harry Schefe, Pacific Palisades, Calif.

[73] Assignee: Caltemp Instrument Inc., Pacific Palisades, Calif.

[22] Filed: Dec. 6, 1973

[21] Appl. No.: 422,184

[52] U.S. Cl. ............... 346/68, 73/343.5, 346/33 TP, 346/136
[51] Int. Cl. ......................... G01k 5/70, G01d 15/28
[58] Field of Search.......... 73/343.5; 346/68, 33 TP, 346/136, 114, 116, 117

[56] References Cited
UNITED STATES PATENTS

| | | | |
|---|---|---|---|
| 1,264,478 | 4/1918 | Barstow | 73/343.5 |
| 1,569,797 | 1/1926 | Wohrle | 346/68 X |
| 1,667,492 | 4/1928 | Ralston | 346/136 |
| 1,816,826 | 8/1931 | Cooper et al. | 346/68 |

*Primary Examiner*—Joseph W. Hartary
*Attorney, Agent, or Firm*—Fulwider, Patton, Rieber, Lee & Utecht

[57] ABSTRACT

A recorder for recording a sensed condition on a strip of flexible recording medium. The recorder includes a housing with a support member which releasably supports a coiled up portion of the strip for rotation relative to the housing. A take-up member rotatably connected with the housing is connected to one end of the strip and is driven by a timing mechanism at a predetermined rate, causing the strip to travel continuously in a lengthwise direction along a predetermined path. A sensing unit positioned along the path produces a trace on the strip which varies in amplitude in a direction generally transversely of the strip in response to the sensed condition. Release of the strip from the support member is prevented by a releasable detent. A disabling member connected with the detent moves the sensing unit out of contact with the strip whenever the detent is disengaged from the strip for release.

6 Claims, 12 Drawing Figures

PATENTED FEB 25 1975
3,868,697
SHEET 1 OF 2
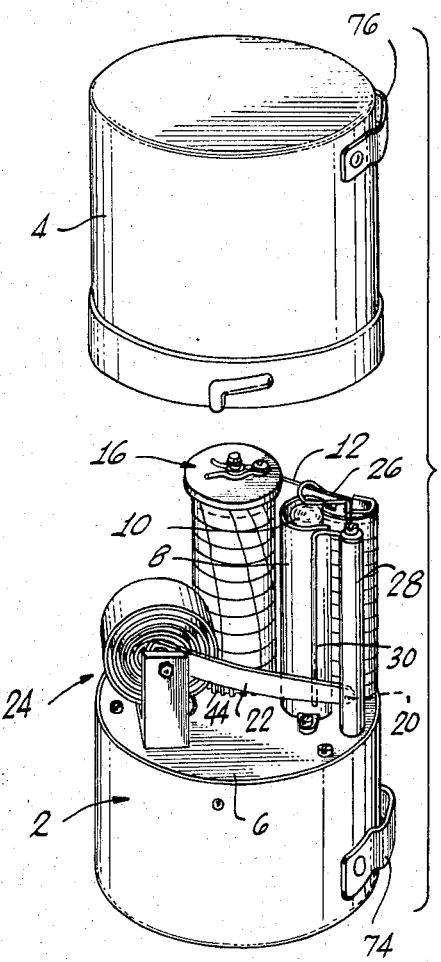
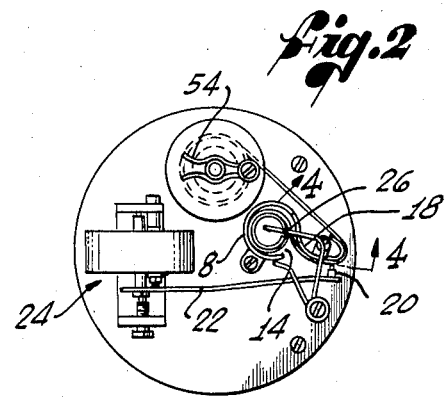
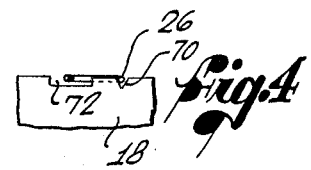
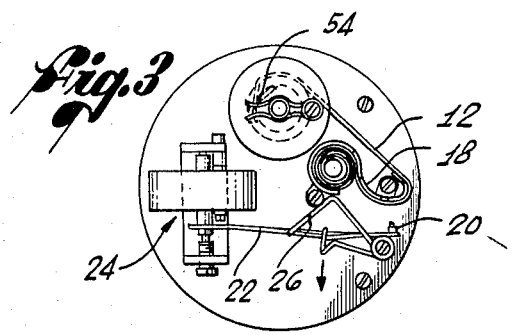
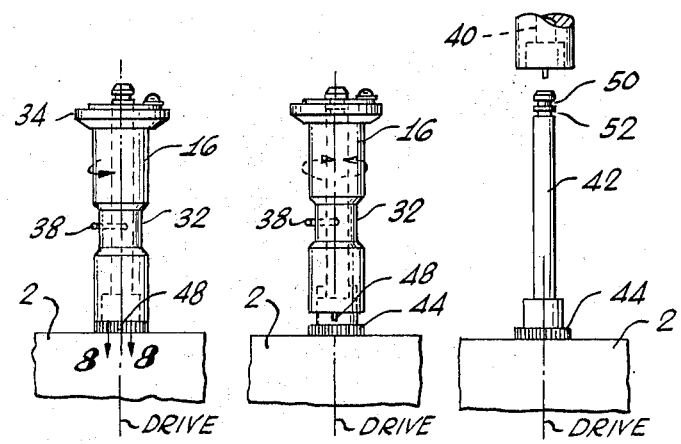
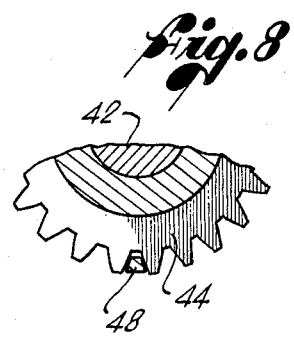

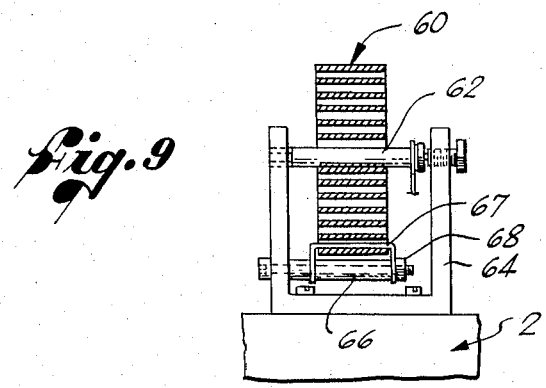
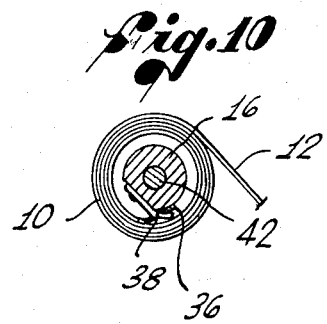
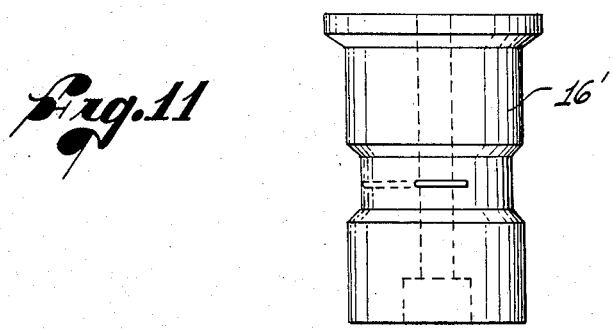
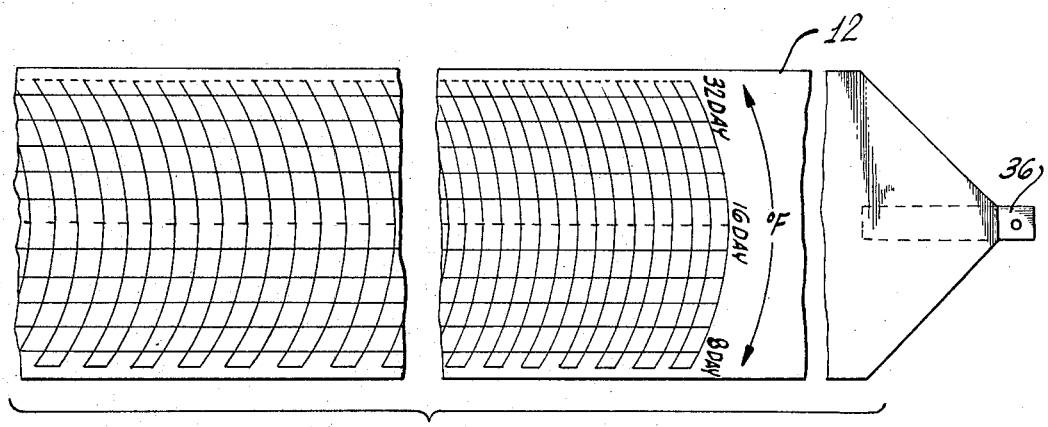

TEMPERATURE RECORDER

BACKGROUND OF THE INVENTION

This invention relates to an instrument for recording a sensed condition on an elongate strip of flexible recording medium over an elapsed period of time. In particular, it relates to a recorder which may be used to produce a time-temperature history of the interior of a refrigerated enclosure, e.g., a refrigerated transport vehicle, in the form of a trace on a paper strip.

In transporting and storing goods, it is sometimes necessary to provide a time-condition history of the goods during their period of shipment or storage. For example, a purchaser of perishable produce may wish to know whether the temperature within a refrigerated railroad car has been maintained within an acceptable range during the period of time the produce has been in transit. Other conditions that may require to be recorded can include, for example, humidity, pressure, acceleration and exposure to light. The present invention will be discussed hereafter with particular reference to temperature measurement, although it will be appreciated that the invention is applicable to devices for sensing other conditions.

Prior temperature recorders have been of several types including drum recorders in which an endless belt mounted on a drum is rotated past a recording element connected to a temperature sensor, and spiral graph recorders in which the recording element produces a trace on a rotating, flat, sheet of recording material. Where the elapsed period of time is of considerable length, for example, several days or so, it may not be convenient to use a drum or spiral type recorder because the dimensionns of the unit would have to be too large to avoid an abnormally compressed trace over the extended period of time involved. Under those circumstances it may be preferable to use a temperature recorder which can produce a trace on a traveling strip recording medium, which is unwound from an initially coiled state and rewound after the trace has been produced on it.

Because a shipper, such as a railroad, may require large numbers of such recorders for its refrigerated cars, and further, because such recorders are employed in an environment where vibration and rough usage are common, it is necessary to devise a strip support and feed system which is compact, sturdy and can be manufactured at low cost. In the use of such devices, the recording strips may have to be removed from the instruments by shipping agents and others who are often not familiar with scientific recording instruments. Under such circumstances there is a high risk that the strip may be torn or the recording instrument damaged unless the arrangement for removal of the strip is easy. For example, if the structure were such that the recording element remained in contact with the strip at the time the strip was being removed, there would be a risk of catching and tearing the strip on the recording element and, in addition, of causing damage to the recording instrument.

It is also desirable to provide a recording instrument which can function for different ranges of elapsed time, e.g., one week, two weeks, or one month, utilizing the same timing mechanism and recording strips of the same length without the need for changing the rate of rotation of any timing drive mechanism used to advance the strip.

SUMMARY OF THE INVENTION

A recorder, constructed in accordance with the preferred embodiment of the invention, is intended to obviate or minimize problems of the type previously described. In particular, the recorder is particularly suited for recording time-temperature histories in refrigerated enclosures, such as refrigerated transport vehicles or warehouses, due to the ease with which the recording strip may be installed and removed without substantial opportunity for damage to either the strip or the instrument. The recorder is also characterized by its simplicity of construction, its ruggedness, and its compact size.

In more detail, the recorder comprises a housing on which is mounted a tube-like support. The support receives a coiled up portion of a strip of flexible recording medium and supports the coiled up portion for rotation relative to the housing. The opposite end of the strip is attached to a take-up spool also rotatably connected with the housing and driven at a constant rate of rotation by a timing mechanism positioned within the housing. In its path between the tube and the spool, the strip passes over a platen which supports the strip against a resiliently biased recording element supported at the free end of a finger extending from a temperature sensor. While the strip is moved continuously in a lengthwise direction of the strip by the timing mechanism, the temperature sensor produces a generally transverse trace on the strip, which varies in amplitude in response to the sensed temperature. Overlying the strip to prevent its removal from the tube is a detent arm connected for swinging motion relative to the housing. The detent arm is connected to a disengaging arm which contacts the finger of the sensing device. Whenever the detent arm is swung out of contact with the strip to free the strip for removal, the disengaging arm concurrently moves the finger out of contact with the recording strip. Thus, avoiding the possibility of ripping the strip on the recording element as the strip is removed, or of thereby damaging the recording element and sensing mechanism.

The spool has a central, hollow bore which slides onto a shaft extending from the housing, to mount the spool detachably on the shaft. The timing mechanism includes a toothed wheel rotatable about an axis concentric with the shaft. An engaging pin at one end of the spool engages the teeth of the wheel to drive the spool. A spool of a particular radius, which determines the linear speed of the strip at a constant rotational rate, may be replaced with a spool of larger or smaller radius to cause a different rate of travel of the recording strip. Thus, by choice of spools and different ranges of time interval marked on the recording strip, it is possible to use the recorder for producing temperature histories over different ranges of elapsed time.

BRIEF DESCRIPTION OF THE DRAWINGS

A recorder according to the invention is illustrated in the accompanying drawings in which:

FIG. 1 is a perspective view of the recorder, constructed in accordance with the preferred embodiment, with the recorder cover shown separated from the remainder of the recorder to reveal its contents;

FIG. 2 is a top view of the recorder shown in FIG. 1, with the cover removed and with the recorder in an operating condition;

FIG. 3 is a view corresponding to FIG. 3 but with the recorder shown in a released condition in which a recording strip is free for removal from the recorder;

FIG. 4 is a cross-sectional side view of a portion of the recorder shown in FIG. 2, taken along the lines 4—4 therein;

FIGS. 5, 6 and 7 show a take-up spool forming a part of the recorder shown in FIG. 1, with the spool being shown initially in an engaged, driven condition, then in an engaged but free-wheeling condition, and finally, in a disengaged condition;

FIG. 8 is a cross-sectional bottom view of a portion of the recorder shown in FIG. 5, taken along the lines 8—8 therein.

FIG. 9 is a cross-sectional end view of a bimetallic temperature sensing coil forming a part of the recorder shown in FIG. 1;

FIG. 10 is a cross-sectional top view of a portion of the take-up spool;

FIG. 11 is a side view of another take-up spool of similar configuration to that shown in FIGS. 5–7, but of relatively greater radius; and FIG. 12 is a view of a recording strip utilized in the recorder shown in FIG. 1.

DETAILED DESCRIPTION

Referring to FIG. 1 of the drawings, a recorder constructed in accordance with the preferred embodiment of the invention is there shown. The recorder includes a cylindrical housing 2 and a cylindrical cover 4 which releasably engages the housing.

Secured to a horizontal, flat upper wall 6 of the housing, is a vertically extending, generally cylindrical tube 8. The tube supports a coiled up portion 10 of an elongate flexible strip 12 of suitable recording medium. In the preferred embodiment, the recording medium is a paper coated with a pressure responsive material which produces a contrasting, visible trace on the strip when a pointed object is pressed against it. The strip 12 passes out through an axially extending opening 14 (FIG. 2) in the tube 8 and has its outer end secured to a take-up spool 16 releasably mounted on the housing for rotation about an axis parallel to and spaced from the axis of the tube 8. A timing mechanism which, in the preferred embodiment, comprises an electrically driven clock timer, rotates the spool 16 at a constant rate so that it unwinds the strip from its coiled portion 10, moving the strip in a lengthwise direction between the tube 8 and the take-up spool onto which the strip is rewound.

In its path from the tube to the spool, the strip 12 passes around a curved, vertical platen 18 (FIG. 2). The platen 18 extends in a smooth curve from the tube 8 along one vertical edge of the opening 14 and has a reversely bent rounded nose portion over which the strip is guided in a direction towards the take up spool 16. The platen 18 supports the strip against the pressure exerted on it by a pointed recording element or stylus 20 mounted at the free end of a resilient finger 22 forming part of a temperature sensor 24. As the temperature varies, the temperature sensor 24 pivots the finger 22 in the vertical plane so that the recording element 20 creates a trace on the pressure sensitive surface of the recording strip. The path of motion of the recording element is in an arcuate path which extends in a direction generally transversely of the strip and its amplitude depends upon the temperature. Thus, it will be appreciated that the transverse movement of the recording element caused by the temperature sensor 24 and the lengthwise movement of the strip caused by the timing mechanism creates a temperature-time trace on the strip 12 of recording material.

Of particular interest in the context of the present invention, is the structure whereby the strip of recording material may be readily loaded into, and removed from, the recording instrument. This structure includes the previously mentioned tube 8 having an open upper end through which the initially coiled strip of recording medium may be slid. The take-up spool 16 is detachably mounted on the housing so that after the strip has been completely, or partially, wound onto the spool, the spool with the strip attached to it may be removed from the housing. A detent arm 26 overlies the open end of the tube 8 and the platen 18 to prevent release of the strip during operation of the recording instrument. The detent arm 26 is of L-shaped configuration and is pivotally connected at one of its ends to the upper end of a vertical pillar 28 connected to the housing extending upwardly in spaced, parallel relation to the platen 18 on an opposite side therefrom to the strip 12. The detent arm 26 may be pivoted from its operating position (FIG. 2) to a released position shown (FIG. 3) in which the detent arm is spaced away from the tube 8 so that the portion of the recording strip 12 remaining within the tube may be slid upwardly out of the tube.

In order to insure that the recording stylus 20 does not bite into the strip 12 during removal and tear it, a disengaging arm 30 (FIG. 1) is connected with the detent arm 26 to deflect the finger 22 so that the stylus is moved away from the strip. The finger 30 extends vertically in spaced, generally parallel relation to the pillar 28 and has a horizontally bent portion at its upper end which connects to the pivoted end of the detent arm 26. The lower end of the disengaging arm 30 is spaced between the platen and the finger 22 and comes into contact with the latter during the pivoting motion of the detent arm 26 to move the stylus out of contact with the recording strip 12. Thus, the risk that an unskilled person removing the recording strip for analysis will tear the strip on the stylus, thereby potentially damaging either or both of them, is substantially reduced because the strip is not free for removal until the stylus has already been moved out of contact with the strip.

The previously mentioned spool 16 (FIGS. 5–7) is of cylindrical configuration having a recessed portion 32 adjacent its midpoint and an enlarged collar or head 34 at the upper axial end. The enlarged head 34 enables the spool to be grasped by the fingers readily, when it is necessary to do so. The recessed portion 32 receives a tab 36 (FIG. 12) at the leading end of the recording strip 12, which connects to a pin 38 (FIG. 10) mounted in the spool wall and having a rearwardly bent free end. Extending through the spool 16 is a central bore 40 which slides freely onto a vertical shaft 42 (FIG. 7) connected with the housing 2, to mount the spool on the housing. Concentric with the shaft 42 is a toothed drive wheel 44 which is rotated at a predetermined constant rate of rotation by the previously mentioned clock mechanism within the housing 2. Any suitable conventional clock mechanism, electrically or mechanically operated, may be utilized to drive the drive wheel 44. For example a synchronous electric motor could be utilized as a suitable mechanism to rotate the shaft 42. At one point on the lower end of the spool 16, there is positioned a depending pin 48 which enters a space between adjacent teeth of the drive wheel 44 so that the latter can rotate the spool. The direction of rotation in such that the strip is unwound from the coiled portion 10.

By grasping the head 34 of the spool with the fingers and drawing it upwardly, after the detent arm 26 has been swung to the released position, the recording strip 12, still wound on the spool, may be removed from the recorder. If there is any part of the coiled up portion remaining within the tube 8, that would also be slid upwardly through the open end of the tube and be withdrawn.

To insure correct axial positioning of the spool 16 on the shaft 42, the shaft is provided with two axially spaced, upper and lower grooves 50 and 52 at its upper end. One or other of the grooves at a time is engaged by a resilient, U-shaped clip 54 (FIG. 2) fixedly mounted on the upper end of the collar 34. When the clip 54 is snapped into the lower groove 52 (FIG. 5), the lower rim of the spool is flush with the tooth portions of the wheel 44 and the pin 48 is drivingly engaged. When the clip 54 is snapped into the upper groove 50 (FIG. 6), the lower rim of the spool 16 is spaced sufficiently above the toothed wheel 44, as shown in FIG. 6, to insure that the pin 48 is out of contact with the teeth. In this condition, the spool is in a free-wheeling state in which it may be rotated on the shaft to take up any slack in the recording strip during initial attachment of the strip to the spool.

In a significant aspect of the invention, it is possible to replace a spool of one diameter, such as the spool 16 shown in FIGS. 5–7, with a spool 16' of relatively larger radius, as shown in FIG. 11. Utilizing the spool 16', because its radius is larger, the linear velocity of the recording strip is increased (in relation to the velocity using the spool 16 shown in FIG. 5) even though the rate of angular rotation of the drive wheel 44 remains unchanged. Similarly, it would be possible to utilize a spool of relatively smaller radius than the spool 16, to provide a relatively lower linear velocity of the strip at an unchanged rate of rotation.

To provide for time-temperature histories over different maximum ranges of time utilizing different linear velocities of travel, the recording strip is provided with different ranges of calibration as shown in FIG. 12. The strip 12 is graduated with a plurality of longitudinally extending, transversely spaced, parallel lines, the transverse spacing between the lines representing increments of temperature. The strip is also divided along its length into a plurality of longitudinally spaced, transversely extending arcs, the longitudinal graduations between adjacent arcuate markings representing equal intervals of time. The arcuate configuration is necessitated by virtue of the fact that the finger 22 causes the stylus to follow an arcuate path rather than one that extends in exactly transverse relation across the strip. The length of time represented by the duration it takes each graduation to pass the location of the stylus depends upon the rate of travel of the strip.

Using the spool 16 of intermediate radius, each of the graduations on the strip 12 of the preferred embodiment represents a 4-hour period so that six of the graduations comprise 1 day. In the preferred embodiment, the strip is of a sufficient length to accommodate 16 days elapsed time as the maximum duration of the range utilizing the intermediate diameter spool 16. dimensions Using the larger spool 16', the strip will pass the recording head at a relatively faster rate so that the same graduation in length represents a shorter period of time. Thus, using the same strip shown in FIG. 12, the space represented by each longitudinal graduation would now represent only 2 hours and the same length of strip would only encompass a maximum range of 8 days, as indicated by the 8-day range scale along the lower end of the strip.

In a like manner, it would be possible to utilize another spool of a smaller radius than the spool 16 so that the linear velocity of the strip was relatively reduced, in which case it would take longer for each graduation to pass the recording head. Utilizing the smaller spool, each graduation would represent 8 hours, and the same length of strip could accommodate a maximum 32 day range of operation, as shown along the upper edge of the strip in FIG. 12.

Because the effective diameter of the take up spool increases as the strip winds onto it, the rate of travel of the strip is subject to a slight, progressive increase. So that the graduations will continue to represent equal time intervals (for each particular range) it is necessary to compensate for the increase in strip velocity by a slight progressive lengthening of the graduations in a direction from the leading to the trailing end of the strip, as shown on a deliberately exaggerated scale in FIG. 12.

The previously mentioned temperature sensing device 24 comprises a coiled bimetallic strip 60 (FIG. 9). The inner end of the coiled strip 60 is secured to a horizontal transverse axle 62 rotatably mounted between the arms of a U-shaped supporting structure 64 connected to the upper wall 6 to the housing 2. The outer end of the coil 60 is fixedly secured to a stationary arm 66 secured to the mounting 64, by an inverted U-bracket 67 the arms of which firmly grip the side edges of the strip adjacent its outer end. The stationary arm 66 passes through aligned holes in the arms of the bracket 67 which is secured in place by a nut 68 threaded onto the end of arm 66. By slackening and retightening the nut 68, the position of the end of the strip can be moved relative to the arm 66 to adjust the span and zero point of the strip. Expansion and contraction of the bimetallic strip causes rotation of the axle 62 in opposite directions. The finger 22 (FIG. 1) is fixedly secured to one end of the axle 62 for vertical rotation thereby. The finger 22, which is made of resiliently deflectable material, such as phosphor bronze, is bowed along its length. The finger yieldably urges the recording element 20 against the surface of the strip as it passes over the platen 18 with sufficient pressure to produce a visible mark on the recording medium. However, the finger is sufficiently resilient that it can be deflected away from the platen, as shown in FIG. 3, by the disengaging arm 30 when the detent arm 26 is swung to the released position.

Although the invention has been described with reference to a temperature recorder, it would be possible to utilize a sensing device for same other condition, having an output comprising a vertically rotatable finger carrying a recording element. For example, without limitation, it would be possible to utilize a pressure sensor, a gas sensor, a humidity sensor, an accelerometer or a light sensor.

To insure that the detent arm 26 does not inadvertently move to the release position during use under the influence of vibration, inversion of the recording instrument, or other disturbances, the upper end of the platen 18 and adjacent portions of the tube 8 are provided with a V-shaped notch 70 and an elongate open slot 72 (FIGS. 1 and 4). The detent arm 26 is of springy material, such as piano wire, and is bent downwardly so that, once seated in the notch 70, the arm resists release from the engaged position. The slot 72 permits the reversely bent portion of the detent arm 26 to pass through. To free the detent arm, it is necessary to apply upward pressure to its free end to elevate the arm from the notches 70 and 72. Thereafter the detent arm is swung to the released, or inoperative, position.

The housing 2 and the cover 4 are provided with upper and lower U-shaped brackets 74 and 76, respectively. In use, with the cover secured to the housing, a suitable supporting member may be passed through the brackets 74 and 76 to support the recorder within the enclosure whose temperature is to be recorded and, also, to prevent separation of the cover from the housing during use so that the contents are protected.

Although the invention has been described with reference to a preferred embodiment, it will be understood by those skilled in the art that many deletions, additions, substitutions, modifications, and other changes may be made which will fall within the spirit of the invention.

I claim:

1. A recorder for recording a sensed condition on a flexible elongate strip of recording medium over an elapsed period of time, the recorder comprising:
   a housing;
   support means connected to said housing for releasably supporting a coiled portion of the strip for rotation relative to said housing with the strip having one end remote from the coiled portion;
   take-up means rotatably connected with said housing, said take-up means connected to the one end of the strip for unwinding the strip and for rewinding portions of the strip onto said take-up means; said support means and said take-up means supporting the strip for releasing motion in a direction outwardly from said housing and perpendicular to the direction of travel of the strip between said support and take-up means;
   a timing mechanism connected with said take-up means for continuous rotation thereof at a predetermined rate thereby causing the strip to travel continuously in a direction lengthwise of the strip along a predetermined path extending between said support means and said take-up means;
   sensing means positioned along said predetermined path in contact with the strip for producing thereon a trace which varies in amplitude in a direction generally transverse of the strip in response to variation in the sensed condition;
   an arm connected with said housing for swinging motion between an operative position in which portions of said arm are in overlapping relation to an edge portion of the strip remote from said housing to prevent releasing motion thereof, and an inoperative position in which said arm is spaced away from the strip during releasing motion thereof; and
   disengaging means connected with said detent means for moving said sensing means out of contact with the strip whenever said arm is moved to the inoperative position.

2. A recorder for recording a sensed condition on a flexible elongate strip of recording medium over an elapsed period of time, the recorder comprising:
   a housing;
   support means connected to said housing for releasably supporting a coiled portion of the strip for rotation relative to said housing with the strip having one end remote from the coiled portion;
   take-up means rotatably connected with said housing, said take-up means connected to the one end of the strip for unwinding the strip and for rewinding portions of the strip onto said take-up means, said support means and said take-up means supporting the strip for releasing motion in a direction outwardly from said housing and perpendicular to the direction of travel of the strip between said support and take-up means;
   a timing mechanism connected with said take-up means for continuous rotation thereof at a predetermined rate thereby causing the strip to travel continuously in a direction lengthwise of the strip along a predetermined path extending between said supporting means and said take-up means;
   a platen fixed to said housing slidably abutting one side of the strip at a location along said predetermined path;
   a recording element yieldably biased towards said platen on an opposite side of the strip from said platen, said recording element movable in a transverse direction relative to the lengthwise motion of the strip in response to the variation in the sensed condition to produce a trace on the strip;
   a detent arm connected with said housing for swinging motion between an operative position in which portions of said detent arm are in overlapping relation to an edge portion of the strip remote from said housing to prevent releasing motion thereof and an inoperative position in which said detent arm is spaced away from the strip during releasing motion thereof; and
   a disengaging arm connected with said housing, said detent arm and said disengaging arm having a common point of pivotal connection to the housing and being arranged so that said detent arm, in the operative position overlaps the edge portion of the strip with said disengaging arm positioned out of contact with said recording element, pivoting movement of said detent arm to the inoperative position causing said disengaging arm to contact said recording element for movement thereof out of contact with the strip.

3. A recorder for recording a sensed condition on a flexible elongate strip of recording medium over an elapsed period of time, the recorder comprising:
   a housing;
   a tube secured at one of its ends of the housing and open at its other end, said tube adapted to slidably receive the coiled portion of the strip, said tube having an axially extending opening through which the strip may pass;
   a spool releasably connected with said housing for rotation about an axis parallel to and spaced from said tube, said spool being adapted to engage the one end of said strip;

means releasably connecting said spool to said housing, said spool being detachable from said housing after a predetermined axial separation movement from said housing;

a timing mechanism connected with said spool for continuous rotation thereof at a predetermined rate thereby causing the strip to travel continuously in a direction lengthwise of the strip along a predetermined path extending between said supporting means and said take-up means;

sensing means positioned along said predetermined path in contact with the strip for producing thereon a trace which varies in amplitude in a direction generally transverse of the strip in response to variation in the sensed condition;

a detent arm pivotally connected with said housing for motion between an operative position in which portions of said detent arm are in overlapping relation to an edge portion of the strip remote from said housing and an inoperative position in which said arm is spaced away from the strip to enable the strip to be removed in an axially outward direction from said tube while still wound onto said spool; and disengaging means connected with said detent arm for moving said sensing means out of contact with the strip whenever said detent arm is moved to the inoperative position.

4. A recorder as defined in claim 3, wherein said sensing means includes:

a recording element yieldably biased into contact with one side of the strip;

and wherein said disengaging means includes:

a disengaging arm connected with said detent arm for concurrent pivoting motion therewith, said disengaging arm contacting said recording element to move said recording element out of contact with the strip when said detent arm is pivoted to the inoperative position, thereby facilitating release of the strip.

5. A temperature recorder for use in a temperature controlled enclosure for recording a time-temperature history within the enclosure over an elapsed period of time, the recorder comprising:

a housing adapted to be positioned in the enclosure;

a flexible elongate strip of recording medium having a coiled portion;

a tube secured at one of its ends to the housing and open at its other end, said tube adapted to slidably receive the coiled portion of said strip and having an axially extending opening through which the strip may pass;

a cylindrical shaft supported by said housing extending in spaced parallel relation to said tube;

a spool having a central cylindrical bore slidably receiving said shaft to mount said spool thereon, said spool releasably engaging one end of said strip;

a timing mechanism connected with said housing for continuous rotation at a predetermined rate;

a drive member mounted for rotation about an axis concentric with the axis of said shaft, said drive member being rotated by said timing mechanism;

connecting means on said spool for releasable, driving connection with said drive member whereby when said spool is mounted on said shaft said timing mechanism can drivingly rotate said spool, thereby causing said strip to travel continuously in a direction lengthwise of said strip along a predetermined path between said tube and said spool;

temperature sensing means positioned along said predetermined path in contact with said strip for producing thereon a trace which varies in amplitude in a direction generally transverse of said strip in response to variation in the temperature in the enclosure;

detent means movably connected with said housing for preventing release of said strip, said detent means being selectively movable to an inoperative position to enable said strip to be released;

disengaging means connected with said detent means for moving said sensing means out of contact with said strip whenever said detent means is moved to the inoperative position;

axially spaced first and second engaging portions on said shaft; and cooperating means on said spool for separate engagement with said either of said engaging portions thereby enabling said spool to occupy alternative first and second axial positions on said shaft, said connecting means in one of said positions being drivingly engaged with said drive member to cause said spool to be driven by said timing mechanism, said spool in the other of said positions having said connecting means spaced out of contact with said drive member to enable said spool to be rotated freely on said shaft without driving connection to said timing mechanism.

6. A temperature recorder for use in a temperature controlled enclosure for recording a time-temperature history within the enclosure over an elapsed period of time, the recorder comprising:

a housing adapted to be positioned within the enclosure;

a flexible elongate strip of recording medium having a coiled portion;

support means connected to said housing for releasably supporting the coiled portion of said strip for rotation relative to said housing, said strip having one of its elongate ends remote from the coiled portion;

take-up means connected with said housing, said take-up means connected to said one end of said strip for unwinding said strip and for rewinding portions of said strip onto said take-up means;

a timing mechanism connected with said take-up means for continuous rotation thereof relative to said housing at a predetermined rate thereby causing said strip to travel continuously in a direction lengthwise of said strip along a predetermined path between said support means and said take-up means;

temperature sensing means positioned along said predetermined path in contact with said strip for producing thereon a trace which varies in amplitude in a direction generally transverse of said strip in response to variation in the temperature in the enclosure;

said take-up means including, a spool releasably connected with said housing and with said timing mechanism for rotation about an axis parallel to and spaced from the axis of the coiled portion of said strip, said one end of said strip being releasably connected to said spool, said spool being alternatively interchangeable with otherwise substantially identical spools of differing radius to enable the linear rate of movement of said strip to be varied;

said elongate strip being marked with graduations along its length representative of fixed intervals of time determined by the duration it takes each graduation to move past said sensing means, said strip adjacent one of its longitudinal edges being marked with graduations appropriate for movement at one rate of travel determined by use of one of said spools of one predetermined radius, said strip having graduations of a different length along an opposite edge of said strip of appropriate length for the time intervals when using another of said spools of a different radius from said one radius.

* * * * *